US009126605B2

(12) United States Patent
Mayer et al.

(10) Patent No.: US 9,126,605 B2
(45) Date of Patent: Sep. 8, 2015

(54) BRAKING PROCESS FOR A RAIL VEHICLE (75) Inventors: Reinhold Mayer, Karlsfeld (DE);
Thomas Rasel,
Höhenkirchen-Siegertsbrunn (DE);
Marc-Oliver Herden, Munich (DE);
Joerg-Johannes Wach, Munich (DE)

(73) Assignee: KNORR-BREMSE SYSTEME FUR SCHIENENFAHRZEUGE GMBH, Munich (DE)

(*) Notice: Subject to any disclaimer, the term of this patent is extended or adjusted under 35 U.S.C. 154(b) by 9 days.

(21) Appl. No.: 14/342,793

(22) PCT Filed: Sep. 7, 2012

(86) PCT No.: PCT/EP2012/067518
§ 371 (c)(1),
(2), (4) Date: Jun. 24, 2014

(87) PCT Pub. No.: WO2013/034694
PCT Pub. Date: Mar. 14, 2013

(65) Prior Publication Data
US 2014/0303817 A1    Oct. 9, 2014

(30) Foreign Application Priority Data
Sep. 9, 2011 (DE) .......................... 10 2011 113 073

(51) Int. Cl.
*B61H 13/00* (2006.01)
*B60T 8/17* (2006.01)
(Continued)

(52) U.S. Cl.
CPC .............. *B61H 13/00* (2013.01); *B60T 8/1705* (2013.01); *B60T 13/665* (2013.01); *B60T 13/748* (2013.01); *B61H 7/06* (2013.01)

(58) Field of Classification Search
CPC ... B60T 8/1705; B60T 13/665; B60T 13/748; B61H 7/06; B61H 13/00

USPC ........................ 701/19; 303/132, 112, 7, 9.61; 188/181 T, 35; 291/2, 19, 3; 246/182 B
See application file for complete search history.

(56) References Cited

U.S. PATENT DOCUMENTS 2,025,889 A    12/1935  Pardee
5,297,856 A     3/1994  Asano
(Continued)

FOREIGN PATENT DOCUMENTS

DE    60026290 T2    8/2006
WO    0071399 A1    11/2000

OTHER PUBLICATIONS

Notification Concerning Transmittal of International Preliminary Report on Patentability and Written Opinion of the International Search Authority for International Patent Application No. PCT/EP2012/067518 dated Sep. 7, 2012.
(Continued)

Primary Examiner — Marthe Marc-Coleman
(74) Attorney, Agent, or Firm — Barnes & Thornburg LLP (57) ABSTRACT A control device for a brake system of a rail vehicle, the brake system having at least one first brake device and a second brake device, which devices can be actuated by an actuating force during a braking process. The first brake device and the second brake device are adhesion-type brake devices. The control device is capable of receiving and/or generating a loss of adhesion signal, which identifies insufficient adhesion for the first and/or second brake device, and is also designed, during a braking process, to actuate the first and/or second brake device with an increased actuating force if a loss of adhesion signal is present. Also disclosed is a brake system for a rail vehicle having a control device of this type, a corresponding rail vehicle and a method for controlling the brake system of a rail vehicle using a control device.

10 Claims, 2 Drawing Sheets

(51) Int. Cl.
  *B61H 7/06* (2006.01)
  *B60T 13/74* (2006.01)
  *B60T 13/66* (2006.01)

(56) References Cited

U.S. PATENT DOCUMENTS 5,390,990 A 2/1995 Cook et al.
6,629,709 B1 * 10/2003 Tunley et al. ............ 291/2
2011/0175435 A1 * 7/2011 Wuerth et al. ............ 303/3

OTHER PUBLICATIONS

English Translation of Notification Concerning Transmittal of International Preliminary Report on Patentability and Written Opinion of the International Search Authority for International Patent Application No. PCT/EP2012/067518 dated Sep. 7, 2012.
Search Report for International Patent Application No. PCT/EP2012/067518; Feb. 27, 2013.

* cited by examiner

BRAKING PROCESS FOR A RAIL VEHICLE

PRIORITY CLAIM

This patent application is a U.S. National Phase of International Patent Application No. PCT/EP2012/067518, filed 7 Sep. 2012, which claims priority to German Patent Application No. 10 2011 113 073.3, filed 9 Sep. 2011, the disclosures of which are incorporated herein by reference in their entirety.

FIELD

Disclosed embodiments relate to a control device for a brake system for a rail vehicle having at least one first and one second braking device and to a brake system for a rail vehicle, a rail vehicle and a method for controlling a brake system of a rail vehicle.

BACKGROUND

Different types of brakes are used to brake rail vehicles. In general, what are known as "adhesion-dependent" brakes are used as the normal service brakes. Adhesion-dependent brakes of this kind transmit a braking force via a contact between the wheel and the rail. However, such contact has only a limited capacity to accept braking force. The capacity to accept braking force via a wheel/rail contact is defined by adhesion between the wheel and the rail, and this can be parameterized by an adhesion coefficient. If the braking force that can be transmitted by the adhesion is exceeded by an actuating force for braking a wheel, the wheel may begin to slide or lock up. To prevent this, brake systems of rail vehicles generally have wheel slide protection devices, which are able to reduce an actuating force for a brake when the adhesion is exceeded.

Moreover, it is not possible, when the adhesion is exceeded, to produce an envisaged total braking force for braking the rail vehicle, resulting in the possibility that a braking distance will be longer. Adhesion depends decisively on the friction conditions between the wheel and the rail and can differ from wheel to wheel, especially in the case of relatively long rail vehicles, owing to differences in rail conditions.

Disclosed embodiments allow improved braking by a brake system having adhesion-dependent braking devices.

BRIEF DESCRIPTION OF THE FIGURES

Disclosed embodiments will be explained by way of example with reference to the accompanying drawings, in which.

DETAILED DESCRIPTION OF THE DISCLOSED EMBODIMENTS

Within the context of this description, a rail vehicle can denote one or more cars with or without a built-in drive and/or a locomotive in any combination. In particular, a rail vehicle can have motor coaches. It is conceivable that one or more bogies, on each of which one or more wheel axles can be provided, will be provided on a car of a rail vehicle. Each wheel axle can rigidly connect two wheels or can serve for independent suspension of a wheel. A brake system can have a number of braking devices, in particular a number of adhesion-dependent braking devices.

An adhesion-dependent braking device is capable of transmitting a braking force exerted by it for braking via a wheel/rail contact to the rail. In particular, adhesion-dependent braking devices can comprise friction braking devices, such as block brakes, disk brakes or combined block/disk brakes. Friction braking devices are capable, by exerting an actuating force, of bringing friction elements into frictional contact with one another to brake the rail vehicle and/or a wheel of the rail vehicle. A friction braking device can have a friction pair. A friction pair comprises at least two friction elements, which are brought into contact upon actuation.

As friction elements, a friction pair can have, for example, a brake lining of a brake block and a running surface of a wheel or a brake disk and one or more brake pads of a disk brake caliper. An individual friction braking device can be designed to brake an individual wheel or an individual wheel axle. A braking device can be designed to brake at least one associated wheel, via which it can transmit a braking force to the rail. In general, a braking device can have one or more friction braking devices for braking a wheel and/or a wheel axle and/or the wheels or wheel axles associated with a bogie, e.g. one or more brake disks and associated brake calipers or one or more brake blocks. Provision can be made for a braking device to have one or more force generators, which can be provided to generate an actuating force for braking an associated wheel, an associated wheel axle, of the wheels or wheel axles arranged on a bogie or of the wheels or wheel axles mounted on a car. The force generator or generators can be activated separately to brake a wheel or a wheel axle and/or can be supplied with a brake pressure or a braking current. A force acting relative to the rail to brake a wheel or rail vehicle can be referred to as a braking force. A total braking force acting on the rail vehicle is the sum of the individual braking forces provided by all the effective braking devices and braking effects.

A force exerted on a friction braking device for the purpose of braking can be referred to as actuating force. An actuating force can be exerted by a brake caliper, for example, which brings one or more brake pads into frictional contact with a brake disk of a disk brake. A force which brings a brake block into frictional contact with a running surface of a wheel can also be regarded as an actuating force. The actuating force exerted to actuate a braking device can be defined by the sum of the actuating forces exerted on friction braking devices of the braking device to brake a particular wheel or a particular wheel axle. It is also conceivable that the actuating force exerted to actuate a braking device be defined by the sum of the actuating forces exerted on friction braking devices of the braking device to brake the wheels or wheel axles of a bogie.

Owing to frictional effects within a friction braking device and between the wheel and the rail, not all the actuating force is converted into a braking force. To generate an actuating force, a braking device can have at least one force generator or force converter assigned to it. A force generator of this kind can be a pressure cylinder supplied with a brake pressure or an electrically actuated actuator, for example. If a brake pressure is supplied pneumatically, the braking device is pneumatic. If the brake pressure is supplied hydraulically, it is a hydraulic braking device. If an electrically actuable actuator is supplied with a braking current, which it converts into actuating force, this is an electric or electromechanical braking device.

Provision can be made for electrically activatable valve devices, e.g. solenoid valves, to be provided for controlling a brake pressure. A braking device with an electrically activatable valve device of this kind can be referred to as an electropneumatic or electrohydraulic braking device. A particular braking device can be distinguished from another braking device by the fact that it can transmit a braking force to the rail via a different wheel, a different wheel axle, different wheels and/or different wheel axles from the other braking device. It is also conceivable for a particular braking device to be defined by force generators activated by means of a common control unit, such as a common control valve device, and/or supplied with a common brake pressure.

The activation of a braking device can entail supplying a particular brake pressure or braking current and/or activation in such a way that a particular actuating force and/or braking force is exerted. Activation in this way can be accomplished by means of a control device, in particular an electronic control device. For example, an electronic control device can be designed to activate electrically activatable valve devices of a braking device in such a way that one or more force generators are each supplied with a particular brake pressure, which these force generators can in each case convert into an actuating force. It is conceivable for force generators of one or more braking devices to be activated in such a way that they each exert an identical actuating force or that they exert different actuating forces. For this purpose, provision can be made, for example, for the force generators or friction braking devices to be capable of separate activation, either individually or in groups. In particular, it is conceivable for each of the force generators of a pneumatic or hydraulic braking device to be assigned respective control valve devices, by means of which a brake master pressure fed to a plurality of force generators can be varied individually for the individual force generators or for a group of force generators. In particular, outlet valves can be provided, via which a brake pressure applied to a force generator can be reduced. Outlet valves of this kind can be part of a wheel slide protection device.

Disclosed embodiments relate to a control device for a brake system for a rail vehicle, wherein the brake system has at least one first braking device and one second braking device, which devices can be actuated with an actuating force during a braking process. The first braking device and the second braking device are adhesion-dependent braking devices. The control device is capable of receiving and generating an adhesion deficiency signal, which indicates insufficient adhesion for the first and/or second braking device. The control device is furthermore designed, during a braking process, to actuate the first and/or second braking device with a raised actuating force if an adhesion deficiency signal is present. Thus, it is envisaged that, in response to an adhesion deficiency signal, a raised actuating force is exerted on at least one of the braking devices of the brake system. It is assumed here that not all the wheels and/or associated braking devices have insufficient adhesion but that at least one wheel and/or one associated braking device has reserves of adhesion which allow it to accept a raised braking force. It is thus possible, by means of this braking device, to generate an additional braking force which compensates for the braking force that cannot be transmitted owing to the lack of adhesion. In this case, the first braking device can be designed to brake a first wheel, which can be assigned to a first wheel axle.

The second braking device can be designed to brake a second wheel, which is assigned to a second wheel axle. The first wheel and the second wheel can be capable of rotation independently of one another, by not being arranged on a common wheel axle for instance. It is conceivable that the first wheel axle is provided on a different bogie from the second wheel axle. In general, the first braking device can be designed to brake one or more wheels on a first bogie. The second braking device can be designed to brake one or more wheels on a second bogie. Provision can be made for the braking devices to be actuated with an actuating force which is lower than the raised actuating force during a braking process preceding the presence of the adhesion deficiency signal.

An increase in the actuating force with which the first and/or second braking device is actuated can, for example, be achieved if actuation of one or more already actuated friction braking devices of the respective braking device with a raised force is activated by the control device. For this purpose, a corresponding increase in brake pressure or braking current can be activated, for example. As an alternative or in addition, provision can be made for one or more friction braking devices or friction generators of the braking device which have not previously been activated or actuated to be actuated. Here, at least one of the first and second braking devices can have one or more additional friction braking devices and/or force generators. It is conceivable for the first and second braking devices to have a different number of friction braking devices. In this case, provision can be made for the braking device with the higher number of friction braking devices to be activated for actuation with a raised actuating force. The corresponding activation can be accomplished by means of the control device, based on a braking demand for example.

It is conceivable for the activation to be based on a braking demand and/or for the actuation to be carried out with a corresponding actuating force by a different control device, e.g. by a brake control device. It is self-evident that an adhesion deficiency signal is only made available when the adhesion is in fact insufficient on at least one wheel. In general, provision can be made for the braking devices to be actuated on the basis of an activation with a first actuating force, lower than the raised actuating force, before the occurrence of the adhesion deficiency signal. An adhesion deficiency signal can be deemed to be present when it has been generated and/or received by the control device. The brake system can have a wheel slide protection system which is capable of activating the associated braking device in such a way, in the case of a lack of adhesion for one wheel and/or an associated braking device, that its actuating force is reduced to such an extent that sliding or locking up of the associated wheel or of the associated wheels is prevented and/or that the braking force exerted is reduced to such an extent that it can be accepted via the rail. In general, an adhesion deficiency signal can indicate that there is insufficient adhesion available for a wheel to convert the actuating force exerted by a braking device designed to brake the wheel into a braking force to an extent sufficient to satisfy a braking demand. Such a case means that there is insufficient adhesion available for a braking device provided to brake the wheel.

The adhesion deficiency signal can be a signal which is generated on the basis of an adhesion measurement. The adhesion deficiency signal can give a quantitative indication of adhesion and/or a qualitative indication of a lack of adhesion. It is conceivable that the adhesion deficiency signal should be based on a comparison between an actual retardation of the rail vehicle and a desired retardation. The comparison can be carried out by the control device on the basis of corresponding signals, which can be made available by suitable sensor or control devices to generate the adhesion deficiency signal. It is also conceivable that a corresponding adhesion deficiency signal should be transmitted to the control device. In general, provision can be made for the control device to be designed to generate an adhesion deficiency signal on the basis of data relating to adhesion and/or to be capable of receiving an adhesion deficiency signal generated on the basis of data relating to adhesion. The control device can be linked or can be capable of being linked for activation of the at least one first braking device and of a second braking device.

Actuation of a braking device with a particular actuating force can include the activation of elements of the brake system and/or of the braking device in such a way that one or more force generators of the braking device make available the particular actuating force and/or that a particular actuating force, a raised actuating force for instance, is made available. Activation in this way can be accomplished by means of a suitable control device, in particular by means of the control device designed to receive and/or generate the adhesion deficiency signal. For this purpose, provision can be made, for example, for the control device to activate one or more control valve devices in such a way that a particular brake pressure acts on the force generator or generators to generate an actuating force. Activation of a braking device by a control device can include the activation of the braking device so as to make available a particular brake pressure or to generate a particular actuating force and/or braking force, e.g. by means of an electronic control device, such as a braking force manager.

The activation of a braking device by a wheel slide protection device or a wheel slide protection computer to reduce a brake pressure and/or an actuating force can also be regarded as activation by a control device, with the wheel slide protection device or the wheel slide protection computer corresponding to the control device. The control device can furthermore be designed to receive an adhesion deficiency signal from some other control device or from a sensor device. An actuating force can be regarded as raised when it is higher, for the same braking demand, than an actuating force that is to be activated or has been activated to satisfy the braking demand. To generate the adhesion deficiency signal, an adhesion sensor can be provided. In this context, a wheel speed sensor, for example, can be regarded as an adhesion sensor since wheel speed data can be used to determine a wheel slip, from which it is possible to infer a lack of adhesion or, given a knowledge of the prevailing braking forces and/or actuating forces for example, an adhesion coefficient.

It is conceivable for the control device to be designed to interpret a signal which describes adhesion quantitatively as an adhesion deficiency signal if the indicated adhesion is below a predetermined adhesion. It is possible to envisage that a lack of adhesion is present and/or that an adhesion deficiency signal is generated when the adhesion for at least one wheel and/or at least one braking device assigned to a wheel is not sufficient to implement a braking demand or a desired braking value. A braking demand or a desired braking value can be made available to the control device by external activation, for example, e.g. through the input of a train driver or through a higher-ranking or equal-ranking control device. It is self-evident that the brake system can have more than two adhesion-dependent braking devices. It is conceivable that the control device be designed to carry out activation of corresponding adhesion-dependent braking devices, in particular braking devices of a common type, throughout the vehicle on the basis of an adhesion deficiency signal.

Braking devices can belong to a common type if the actuating force thereof is generated in the same way and/or if they are capable of converting an actuating force into a braking force in the same way. In particular, friction braking devices, such as disk brakes and block brakes, each belong to the same type. Activation can be regarded as based on an adhesion deficiency signal if it takes place in response to reception or generation of an adhesion deficiency signal, i.e. when there is an adhesion signal. The control device can be designed to activate one or more of these braking devices with a raised actuating force when an adhesion deficiency signal is present. It is conceivable for the control device to be capable of actuating particular braking devices, the associated wheels of which have a higher adhesion than other braking devices, with a raised actuating force, while the other braking devices are actuated with an unchanged and/or lower actuating force.

The control device can comprise a plurality of components, e.g. a plurality of control units linked together for data transmission. Provision can be made for the control device to be a wheel slide protection computer, a brake computer, a braking force manager or a train computer or to comprise a plurality of the devices. It is possible to envisage that the control device will be designed to receive adhesion data relating to one or more wheels and/or one or more braking devices and to activate the brake system and/or braking devices on the basis of the adhesion data. Adhesion data can be determined and made available by means of a suitable sensor device, for example. In general, it can be expedient to design the control device to actuate a braking device with a raised actuating force only when the braking device and/or the associated wheels are capable of converting the raised actuating force into a braking force. For this purpose, monitoring of the adhesion of corresponding wheels can be provided. In particular, provision can be made for the control device to be capable of making an association, based on the adhesion deficiency signal, as to which braking device is not capable of transmitting the desired braking force to the rail owing to the lack of adhesion. The control device can expediently be designed not to actuate corresponding braking devices with a raised actuating force.

As an alternative or in addition, provision can be made for the control device to activate adhesion-raising measures for one or more braking devices and/or wheels. In general, it can be expedient for the control device to be designed to activate actuation with a raised actuating force for braking devices at which conversion of the raised actuating force into a braking force can be expected by virtue of measures such as sanding.

The control device can be designed to actuate the first and/or second braking device with a raised actuating force while the adhesion deficiency signal is present. In this way, it is possible to respond to a current lack of adhesion, in particular. It can be assumed here that the adhesion deficiency signal is generated in real time when there is in fact a lack of adhesion at at least one wheel.

It can be expedient if the control device is designed to activate a raised actuating force by raising a brake pressure. This is a particularly simple way of making available a raised actuating force for pressure-actuated braking devices. Here, a raised brake pressure can be made available for one or more braking devices.

In at least one disclosed embodiment, provision can be made for the control device to be designed to activate at least one particle scattering system when the adhesion deficiency signal is present to discharge adhesion-raising particles onto a rail. By activation of the at least one particle scattering system, it is thus possible to raise adhesion, at least for some wheels. A particle scattering system can have a dispensing device for discharging particles onto the rail. The particles can comprise sand or ceramic materials, for example. It is conceivable for the particle scattering system to be assigned to one or more wheels, the adhesion of which it can increase by discharging particles. A particle scattering system can in each case be assigned to wheels which are arranged behind it in the direction of travel of the rail vehicle. In this case, the control device can be designed to adapt the assignment of a particle scattering system to a direction of travel.

The activation of the particle scattering system can take place in the presence of the adhesion deficiency signal before a raised actuating force is activated. In this way, a two-stage response can be made to an adhesion deficiency signal. In the first stage, activation of at least one particle scattering system is provided to improve adhesion for at least some wheels. If the particle scattering system is not sufficient, the actuating force for one or more braking devices can additionally be raised in a second stage. It is also conceivable for the activation of the particle scattering system and the activation of a raised actuating force to take place substantially simultaneously. It is also conceivable, as an alternative or additional adhesion-raising measure, for the control device to activate a rail cleaning device and/or to activate a magnetic rail braking device for cleaning a rail.

Provision can be made for the control device to be designed to activate a braking device with a raised actuating force capable of braking a wheel assigned to the at least one particle scattering system. In this way, it is possible to ensure that a raised actuating force can also be converted into a raised braking force via the corresponding wheel. The braking device can be the first and/or the second braking device.

It is conceivable for the control device to be designed to actuate at least one additional force generator to actuate the first braking device and/or the second braking device with a raised actuating force. An additional force generator can be provided, in particular, for the purpose of raising the actuating force exerted by the braking device to brake a wheel or a wheel axle, and/or the effective braking force. An additional force generator can be provided for the purpose of exerting an additional actuating force on a friction element on which an actuating force is already being exerted. It is also conceivable for an additional force generator to be assigned at least one additional friction element, e.g. an additional brake block. When the additional force generator is actuated, an additional friction element can be brought into frictional contact with a braked wheel to raise the total actuating force exerted for braking a wheel.

Provision can be made for an additional force generator to be unactuated, in particular not to be supplied with a brake pressure, during normal braking, if a raised actuating force is not being exerted. The first and/or second braking device can each be assigned at least one additional force generator and/or an additional friction braking device. In general, provision can be made for one or more particular braking devices to be assigned at least one additional force generator and/or an additional friction braking device. It is not necessary here for each braking device to be assigned an additional force generator. For a pressure-actuated braking device, the additional force generator can be supplied with the same brake pressure as one or more further force generators of the corresponding braking device.

The configuration of the pressure control system and of the pressure line systems as compared with a conventional system can remain the same, while a raised actuating force is made available. Moreover, already existing brake systems can easily be retrofitted with additional force generators and, for example, slight modifications to the wheel slide protection system. It is conceivable for an additional force generator to be assigned an additional control valve, by means of which the additional force generator can be supplied with a brake pressure. The control device can be designed to activate the control valve on the basis of the adhesion deficiency signal in such a way that the additional force generator is supplied with brake pressure. In particular, provision can be made for the additional control valve to be activated by the control device if or only if the adhesion deficiency signal is present to make available a brake pressure for the additional force generator.

The adhesion deficiency signal can be supplied by a wheel slide protection device of the rail vehicle. A wheel slide protection device of this kind is generally designed to detect a lack of adhesion and to output a corresponding signal. It is thus possible to continue using already available systems on a rail vehicle. The adhesion deficiency signal can be represented by a signal which indicates the triggering of a wheel slide protection device.

Disclosed embodiments also relate to a brake system for a rail vehicle having a first and a second adhesion-dependent braking device and a control device described herein, wherein the first and second braking devices can be actuated with an actuating force under the control of the control device.

Disclosed embodiments also relate to a rail vehicle having a brake system described herein and/or a control device described herein.

Disclosed embodiments also relate to a method for controlling a brake system of a rail vehicle by means of a control device, wherein the brake system comprises at least one first braking device and one second braking device. The first and second braking devices are adhesion-dependent braking devices and can be actuated during a braking process with an actuating force. The method comprises the steps of reception and/or generation by the control device of an adhesion deficiency signal, which indicates insufficient adhesion for the first and/or second braking device, and actuation by the control device, during a braking process, of the first and/or second braking device with a raised actuating force if an adhesion deficiency signal is present. The control device can be a control device described herein. The brake system can be a brake system described herein.

Before the step of reception of the adhesion deficiency signal, the method can include a step comprising the activation of the first and second braking devices for braking with a particular first actuating force. The raised actuating force can be greater than the first actuating force. The control device or some other control device can be designed for activation to bring about braking with a particular first actuating force, wherein the control device is designed to actuate the at least one first and/or second braking device with a raised actuating force while the adhesion deficiency signal is present. The control device can activate a raised actuating force by raising a brake pressure. It is conceivable for the control device to activate at least one particle scattering system when the adhesion deficiency signal is present to discharge adhesion-increasing particles onto a rail.

In a development, the control device can activate a braking device with a raised actuating force capable of braking a wheel assigned to the at least one particle scattering system. It is conceivable for the control device to actuate at least one additional force generator to actuate the at least first and/or second braking device with a raised actuating force. The adhesion deficiency signal can be supplied by a wheel slide protection device of the rail vehicle.

Figure 1:
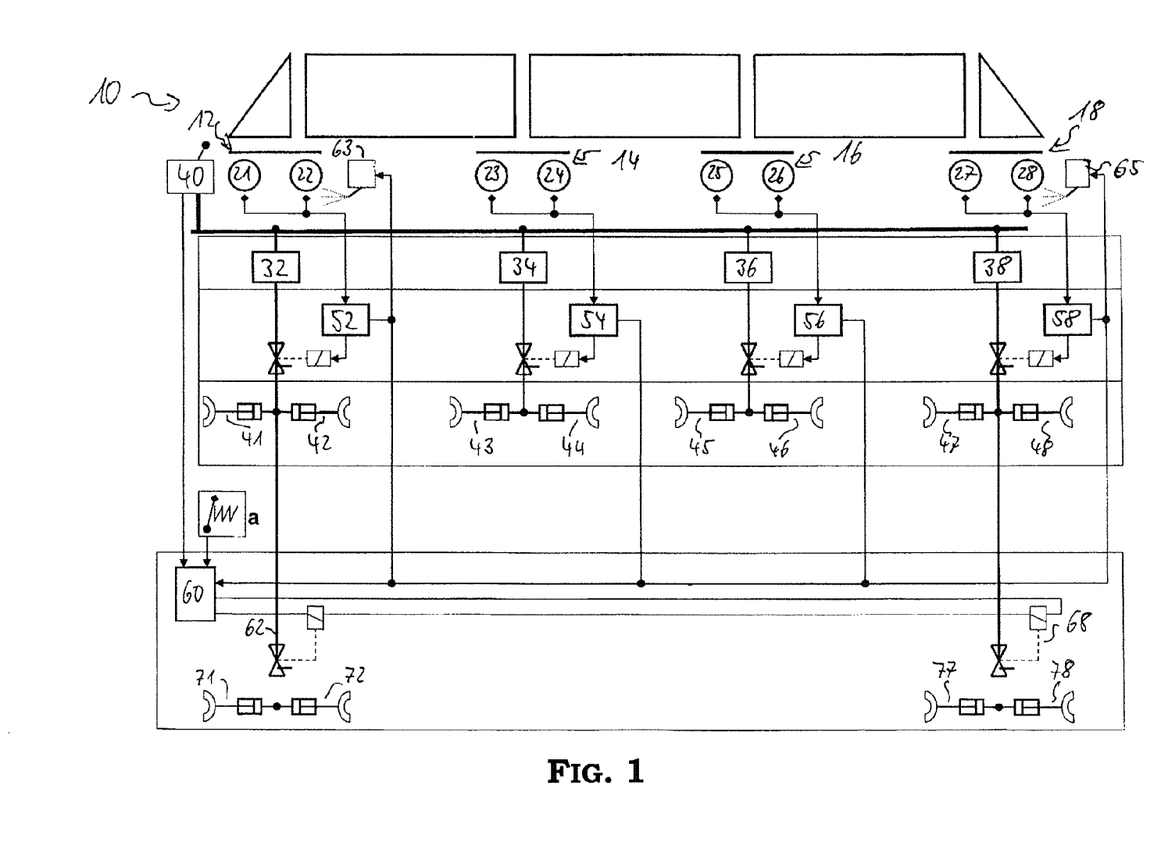
FIG. 1 shows a rail vehicle having a brake system in schematic form.

FIG. 1 shows a rail vehicle 10 in schematic form. The rail vehicle 10 has a plurality of cars, which comprise a first bogie 12, a second bogie 14, a third bogie 16 and a fourth bogie 18. Wheel axles 21, 22 are arranged on the first bogie 12. Wheel axles 23, 24 are provided on the second bogie 14, while wheel axles 25, 26 are provided on bogie 16 and wheel axles 27, 28 are provided on bogie 18. The wheel axles of a bogie are each assigned pressure-actuated braking devices, which are supplied with brake pressure via a common control valve. Thus, the first bogie 12 is assigned a first control valve 32, the second bogie 14 is assigned a second control valve 34, the third bogie 16 is assigned a third control valve 36 and the fourth bogie is assigned a fourth control valve 38. The control valves 32, 34, 36, 38 are connected to a main pressure line, which supplies a control pressure to the control valve devices 32, 34, 36 and 38 in a known manner in accordance with activation by means of a brake controller 40.

The control valve devices 32, 34, 36 and 38 are designed to make available a brake pressure on the basis of the control pressure. As an alternative, the brake pressure can also be made available by brake controllers on each car, which can receive a central electrical brake signal and in each case convert it into a brake pressure. In this example, each wheel axle 21-28 is assigned a friction braking device 41, 42, 43, 44, 45, 46, 47 or 48, which can brake the respective wheel axle. Each friction braking device has a brake block and a pneumatic cylinder, which serves as a force generator for converting a brake pressure made available via the control valve device 32, 34, 36 or 38 into an actuating force. Friction braking devices 41 and 42 are supplied with brake pressure via control valve 32, friction braking devices 43 and 44 are supplied with brake pressure via control valve 34, friction braking devices 45 and 46 are supplied with brake pressure via control valve 36, and friction braking devices 47 and 48 are supplied with brake pressure via control valve 38.

The control valve devices 32, 34, 36 and 38 can be activated by purely pneumatic or electronic means to make available a desired brake pressure. The braking devices 41, 42, 43, 44, 45, 46, 47, 48 should be regarded as part of a standard equipment package for a rail vehicle and can be supplied with brake pressure in a conventional manner. Alternative versions for the supply of the friction braking devices with a brake pressure are conceivable. For example, a version with emergency brake valves having a common emergency braking loop or car-wise control with individual desired value inputs can be provided. Moreover, a hydraulic or electrical or electromechanical brake system with correspondingly actuable friction braking devices and force generators can be provided instead of a pneumatic brake system. Furthermore, each bogie is assigned a wheel slide protection device belonging to a wheel slide protection system. In particular, the first bogie 12 is assigned a first wheel slide protection device 52, the second bogie 14 is assigned a second wheel slide protection device 54, the third bogie 16 is assigned a third wheel slide protection device 56 and the fourth bogie 18 is assigned a fourth wheel slide protection device 58.

Each wheel slide protection device 52, 54, 56, 58 is linked to wheel speed sensors to receive wheel speed data relating to the wheel axles 21-28. Based on wheel speed data, a wheel slide protection device is able to identify a lack of adhesion for a respective wheel axle or bogie. For this purpose, a wheel slide protection device can monitor a wheel slip for one or more wheels, for example. In addition, a braking force manager 60 is provided, which is able to communicate with the wheel slide protection devices 52, 54, 56 and 58. By means of the braking force manager and/or a wheel slide protection device, magnetically activatable outlet valves can be activated, the valves being arranged respectively between one of the control valves 32, 34, 36 or 38 and the friction braking devices supplied via the control valve with brake pressure.

By means of the outlet valves, a brake pressure fed to the corresponding friction braking devices can be reduced if an associated wheel slide protection device detects a lack of adhesion. Thus, the actuating force exerted on the corresponding friction braking device is reduced. This process can be regarded as triggering of the wheel slide protection device. When triggered and/or upon detection of a lack of adhesion, a wheel slide protection device supplies a corresponding adhesion deficiency signal, which it is able to transmit to the braking force manager 60. Moreover, the first bogie 12 is assigned a particle scattering system 63, and the fourth bogie 18 is assigned a particle scattering system 65, wherein the particle scattering systems 63 and 65 are linked to the braking force manager 60. Moreover, particle scattering system 63 is linked to the first wheel slide protection device 52, and particle scattering system 65 is linked to the fourth wheel slide protection device 58.

Each particle scattering system can be activated by means of the braking force manager 60 and/or by means of the associated wheel slide protection device 52 or 58 to discharge particles onto the rail. The second bogie 14 and the third bogie 16 are not assigned any particle scattering systems. As can be seen in FIG. 1, the particle scattering systems in this example are designed to discharge particles onto a rail segment at wheel axle 22 or wheel axle 28. Thus, wheel axle 22 and the wheels thereof are assigned to particle scattering system 63, and wheel axle 28 and the wheels thereof are assigned to particle scattering system 65. Moreover, additional friction braking devices 71, 72 are provided on the first bogie 12, each of the braking devices being capable of braking wheel axle 21 or wheel axle 22. These additional friction braking devices each have additional force generators, which can be supplied with a brake pressure via control valve 32.

Additional friction braking devices 77, 78 are also provided on the fourth bogie 14, each of the braking devices being capable of braking wheel axle 27 or wheel axle 28. These additional friction braking devices 77, 78 each have additional force generators, which can be supplied with a brake pressure via control valve 38. Friction braking devices 71, 72 and friction braking devices 77, 78 are assigned a solenoid valve 62, 68, respectively, which can be activated by the braking force manager 60. In response to appropriate activation by the braking force manager 60, the additional friction braking devices 71, 72 or 77, 78 can be supplied with a brake pressure via a solenoid valve 62, 68. If the braking force manager 60 receives an adhesion deficiency signal from one of the wheel slide protection devices 52, 54, 56 or 58, the braking force manager 60 can perform a two-stage process to improve the adhesion situation and/or braking force situation of the rail vehicle. In the first stage, the braking force manager 60 can activate particle scattering system 63 and/or particle scattering system 65 to discharge particles onto the rail.

As a result, the adhesion at least of wheel axles 22 and 28 is improved, thereby allowing a raised total braking force to be transmitted to the rail. If the raised total braking force is not sufficient to achieve the desired braking effect, the braking force manager 60 can actuate one or more of the additional friction braking devices 71, 72, 77 or 78 in the second stage. As a result, an actuating force, in particular for the friction braking devices 41, 42, 47 and/or 48 which are assigned to wheel axles 21, 22, 27 and/or 28 and to which the particle scattering system is assigned, is raised, thereby allowing a higher braking force to take effect at the wheel axles. This can lead to an increase in the total braking force. Provision can also be made for the braking force manager 60 to be designed to activate one or more of the control valves 32, 34, 36 or 38 in such a way that they make available a raised brake pressure to increase the associated actuating forces. This enables raised braking forces to be established, particularly at the wheel axles 21, 22, 27 and/or 28 assigned to the particle scattering system. Such activation of the control valves 32, 34, 36 or 38 can be performed as an alternative or in addition to the actuation of additional friction braking devices 71, 72, 77 or 78.

As an alternative, provision can be made for the braking force manager 60 to simultaneously actuate one or more particle scattering systems 63, 65 and one or more additional friction braking devices 71, 72, 77, 78 and/or simultaneously to raise the brake pressure made available by at least one control valve 32, 34, 36 or 38. It is conceivable for the braking force manager 60 to be activatable by means of a sensor, denoted by a in FIG. 1, having a switch so as to activate increased exploitation of the adhesion. Provision can be made here for a driver to be supplied with a signal to indicate that there is a lack of adhesion. This signal can be made available by means of mechanical retardation detection, for example.

The friction braking devices 41-48 each act on different wheels or wheel axles, which can be subject to different levels of adhesion. Friction braking devices 41 and 71 and friction braking devices 42 and 72, friction braking devices 47 and 77 and friction braking devices 48 and 78 act on the same wheel axle respectively. In the version shown in FIG. 1, the respective friction braking devices assigned to bogies 12, 14, 16 or 18 can be supplied with a common brake pressure. Thus, all the friction braking devices assigned to one of the bogies can be regarded as part of one braking device. For example, a first braking device can therefore comprise friction braking devices 41, 42, 71 and 72, and a second braking device can comprise friction braking devices 43 and 44. In a corresponding manner, a third braking device can comprise friction braking devices 45 and 46, and a fourth braking device can comprise friction braking devices 47, 48, 77 and 78. In this example, the braking force manager 60 is designed as an electronic control device which is capable of raising the actuating force acting on certain braking devices during a braking process. In particular, the actuating force acting on the first braking device and/or the actuating force acting on the fourth braking device can be raised by actuating the additional friction braking devices 71, 72 and/or 77, 78.

These additional friction braking devices 71, 72 and/or 77, 78 can as it were be switched on during the braking process. At the same time, the brake pressure set can remain the same. The friction braking devices 41-48, 71, 72, 77, 78 and the control valves 32, 34, 36, 38 can be regarded as part of a brake system of the rail vehicle 10. The wheel slide protection devices 52, 54, 56, 58 and the braking force manager 60 can also be regarded as part of the brake system.

Figure 2:
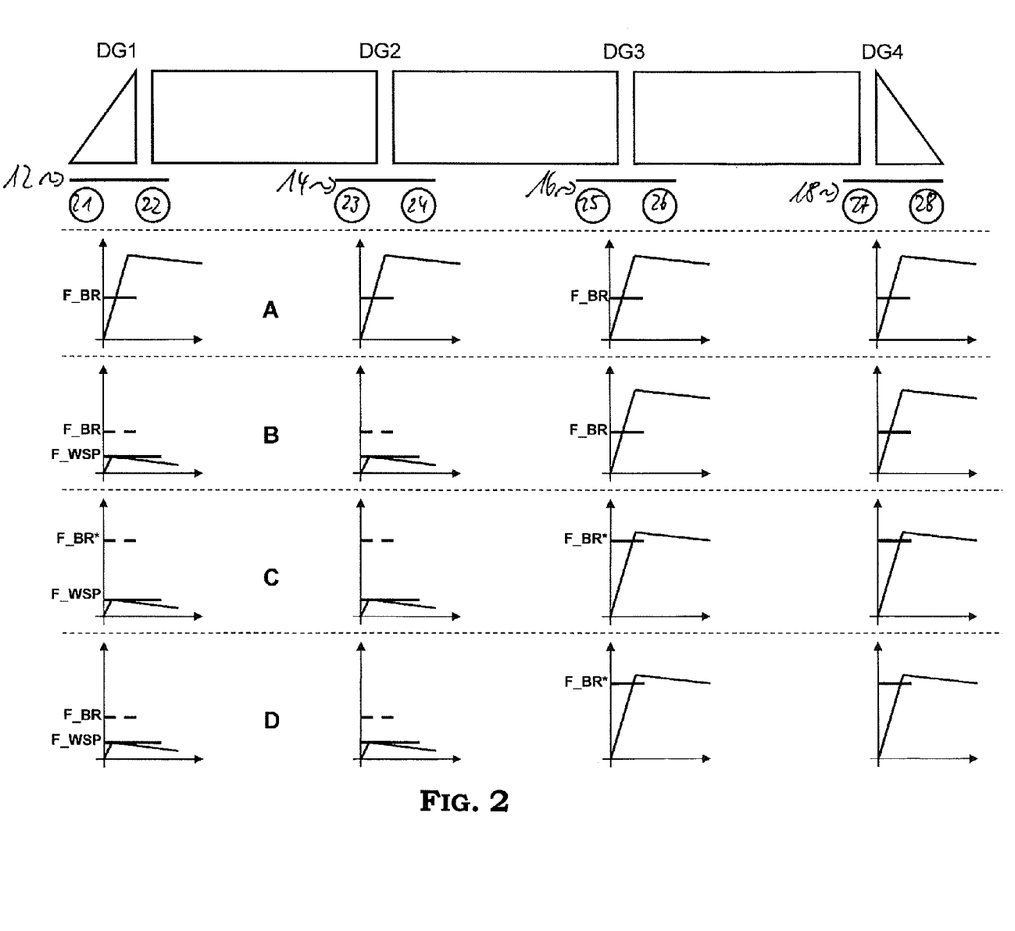
FIG. 2 shows brake force distributions in various braking states in schematic form.

FIG. 2 shows braking force distributions for various illustrative braking states of a rail vehicle in schematic form. In each case, it shows typical adhesion/wheel slip curves for the wheel axles assigned to the bogies 12, 14, 16, 18. It is assumed here that the rail conditions for wheel axles arranged on one bogie do not differ. There are four rows A, B, C, D shown, each representing different braking states. Row A shows a situation in which there is sufficient adhesion for all the bogies to transmit a desired braking force F_BR to the rail. It can be seen that even higher braking forces can be accepted for each bogie in row A since the maximum of the adhesion curve is in each case above the braking force F_BR represented by the bold line. Row B represents a situation in which there is relatively low adhesion for bogies 12 and 14, because the bogies are travelling over a wet rail segment for example.

In this example, the wheel slide protection system intervenes and adjusts the braking force exerted by means of the braking devices of bogies 12 and 14 downward in such a way that a braking force that can be accepted by way of the low adhesion is in each case obtained. The braking force determined by the wheel slide protection system is denoted as F_WSP and is represented by a dashed line. For bogies 16 and 18 the situation is comparable to that indicated by row A. In the state indicated by row B, less braking force is applied to the rail, overall, than is desired since less braking force is applied via bogies 12 and 14 than is required. Row C shows a braking state in which a control device for the braking devices of the bogies 12, 14, 16 and 18 in each case activates a raised actuating force, which can lead to a raised braking force. The adhesion conditions correspond to those indicated by row B. For bogies 12 and 14, the wheel slide protection device once again ensures that only an actuating force that is converted to the braking force F_WSP is effective. In the case of bogies 16 and 18, however, the adhesion conditions allow the conversion of a raised actuating force into a raised braking force F_BR*.

Accordingly, bogies 16 and 18 are braked more strongly than in the state indicated by row B and, overall, a higher braking force acting on the rail vehicle is obtained. Row D shows a state in which only the braking devices which are assigned to wheels that can transmit the raised actuating force as a braking force to the rail are actuated with a raised actuating force. In this case, the control device has not activated the braking devices assigned to bogies 12 and 14 with a raised actuating force owing to the triggering of the wheel slide protection devices of the bogies. Accordingly, the braking devices of bogies 12, 14 are actuated only with a lower actuating force, which would correspond to a braking force F_BR if this could be transmitted to the rail. In fact, the wheel slide protection devices of these bogies 12, 14 in each case adjust the actuating force downward to such an extent that it corresponds in each case to a braking force of F_WSP. The braking devices of bogies 16 and 18, in contrast, are actuated with a raised actuating force, which corresponds to the braking force F_BR*. The total braking force in row D corresponds to that in row C, even if the braking devices of bogies 12 and 14 are activated with higher actuating forces in row C.

The features of the invention which have been disclosed hereinabove, in the drawings and in the claims may be essential to the implementation of the invention either individually or in any combination.

LIST OF REFERENCE SIGNS 10 rail vehicle
12 first bogie
14 second bogie
16 third bogie
18 fourth bogie
21, 22 wheel axles
23, 24 wheel axles
25, 26 wheel axles
27, 28 wheel axles
32 control valve device
34 control valve device
36 control valve device
38 control valve device
40 brake lever/brake controller
41, 42 friction braking device
43, 44 friction braking device
45, 46 friction braking device
47, 48 friction braking device
52 wheel slide protection device
54 wheel slide protection device
56 wheel slide protection device
58 wheel slide protection device
60 braking force manager
62 solenoid valve
63 particle scattering system
65 particle scattering system
68 solenoid valve 71 additional braking device
72 additional braking device
77 additional braking device
78 additional braking device

The invention claimed is:

1. A control device for a brake system of a rail vehicle,
wherein the brake system has at least one first braking device and one second braking device, which devices are actuated with an actuating force during a braking process,
wherein the first braking device and the second braking device are adhesion-dependent braking devices,
wherein the control device receives or generates an adhesion deficiency signal, which indicates a braking force cannot be transmitted due to insufficient adhesion for the first braking device, and
wherein the control device actuates, during a braking process, the second braking device having reserves of adhesion with a raised actuating force if an adhesion deficiency signal is present.

2. The control device of claim 1, wherein the control device actuates the at least one second braking device with a raised actuating force while the adhesion deficiency signal is present.

3. The control device of claim 1, wherein the control device activates a raised actuating force by raising a brake pressure.

4. The control device of claim 1, wherein the control device activates at least one particle scattering system when the adhesion deficiency signal is present to discharge adhesion-raising particles onto a rail.

5. The control device of claim 4, wherein the control device activates a braking device with a raised actuating force capable of braking a wheel assigned to the at least one particle scattering system.

6. The control device of claim 1, wherein the control device actuates at least one additional force generator to actuate the at least one second braking device with a raised actuating force.

7. The control device of claim 1, wherein the adhesion deficiency signal is supplied by a wheel slide protection device of the rail vehicle.

8. A brake system for a rail vehicle having a first and a second adhesion-dependent braking device and a control device as claimed in claim 1, wherein the first and second braking devices are actuated with an actuating force under the control of the control device.

9. A rail vehicle having a brake system as claimed in claim 8.

10. A method for controlling a brake system of a. rail vehicle using a control device, wherein the brake system comprises at least one first braking device and one second braking device, wherein the first and second braking devices are adhesion-dependent braking devices which can be actuated during a braking process with an actuating force, the method comprising:

receiving or generating an adhesion deficiency signal by the control device, which indicates a braking force cannot transmitted due to insufficient adhesion for the first device; and actuating, by the control device during a braking process, the second braking device having reserves of adhesion with a raised actuating force if an adhesion deficiency signal is present.

* * * * *